US008768701B2

(12) United States Patent
Cohen et al.

(10) Patent No.: US 8,768,701 B2
(45) Date of Patent: Jul. 1, 2014

(54) PROSODIC MIMIC METHOD AND APPARATUS

(75) Inventors: Jordan Cohen, Gloucester, MA (US);
Daniel L. Roth, Boston, MA (US); Igor Zlokarnik, Natick, MA (US)

(73) Assignee: Nuance Communications, Inc., Burlington, MA (US)

( * ) Notice: Subject to any disclaimer, the term of this patent is extended or adjusted under 35 U.S.C. 154(b) by 1124 days.

(21) Appl. No.: 10/657,421

(22) Filed: Sep. 8, 2003

(65) Prior Publication Data

US 2004/0148172 A1    Jul. 29, 2004

Related U.S. Application Data

(60) Provisional application No. 60/442,267, filed on Jan. 24, 2003.

(51) Int. Cl.
| | | |
|---|---|---|
| *G10L 15/00* | (2013.01) | |
| *G10L 15/26* | (2006.01) | |
| *G10L 15/04* | (2013.01) | |
| *G10L 13/00* | (2006.01) | |
| *G10L 13/08* | (2013.01) | |

(52) U.S. Cl.
USPC ........... 704/258; 704/260; 704/231; 704/235; 704/251; 704/270; 704/270.1; 704/275

(58) Field of Classification Search
CPC ..... G10L 13/00; G10L 13/02; G10L 13/0335; G10L 13/043; G10L 13/08; G10L 13/086; G10L 13/10; G10L 15/00; G10L 15/04; G10L 15/08; G10L 15/22; G10L 15/26; G10L 15/265; G10L 2013/02; G10L 2013/08; G10L 2013/10; G10L 2013/105; G10L 2015/00; G10L 2015/08; G10L 2015/22; G10L 2015/221; G10L 2015/223; G10L 2015/225; G10L 2015/226; G10L 2015/228; G10L 2015/227; H04M 3/493; H04M 3/4931; H04M 3/4936; H04M 3/4938
USPC ......... 704/258, 260, 231, 235, 251, 275, 270, 704/270.1
See application file for complete search history.

(56) References Cited

U.S. PATENT DOCUMENTS

| | | | | |
|---|---|---|---|---|
| 5,636,235 A | * | 6/1997 | Miyazaki | ................. 372/44.011 |
| 5,682,501 A | * | 10/1997 | Sharman | ...................... 704/260 |
| 5,796,916 A | | 8/1998 | Meredith | ..................... 395/2.67 |

(Continued)

FOREIGN PATENT DOCUMENTS

| | | |
|---|---|---|
| DE | 197 51 123 | 6/1999 |
| EP | 1 271 469 | 1/2003 |

(Continued)

OTHER PUBLICATIONS

Chen, et al., "Mimic: A Voice-Adaptive Phonetic-Tree Speech Synthesiser," ICSLP-98 Proceedings, 4 pages, (1998).

*Primary Examiner* — Paras D Shah
(74) *Attorney, Agent, or Firm* — Sunstein Kann Murphy & Timbers LLP

(57) ABSTRACT

A method and apparatus for synthesizing audible phrases (words) that includes capturing a spoken utterance, which may be a word, and extracting prosodic information (parameters) there from, then applying the prosodic parameters to a synthesized (nominal) word to produce a prosodic mimic word corresponding to the spoken utterance and the nominal word.

19 Claims, 3 Drawing Sheets

(56) References Cited

U.S. PATENT DOCUMENTS

| | | | |
|---|---|---|---|
| 5,842,168 A * | 11/1998 | Miyazawa et al. | 704/275 |
| 5,884,266 A * | 3/1999 | Dvorak | 704/270.1 |
| 5,940,797 A * | 8/1999 | Abe | 704/258 |
| 6,081,780 A * | 6/2000 | Lumelsky | 704/260 |
| 6,161,091 A * | 12/2000 | Akamine et al. | 704/258 |
| 6,308,156 B1 * | 10/2001 | Barry et al. | 704/268 |
| 6,928,408 B1 * | 8/2005 | Matsumoto | 704/254 |
| 7,124,082 B2 * | 10/2006 | Freedman | 704/260 |
| 7,280,968 B2 * | 10/2007 | Blass | 704/266 |
| 7,542,905 B2 * | 6/2009 | Kondo | 704/258 |
| 2002/0173962 A1 * | 11/2002 | Tang et al. | 704/260 |
| 2003/0065512 A1 * | 4/2003 | Walker | 704/258 |
| 2003/0093280 A1 * | 5/2003 | Oudeyer | 704/266 |
| 2004/0056907 A1 * | 3/2004 | Sharma et al. | 345/863 |
| 2004/0073428 A1 | 4/2004 | Zlokarnik et al. | |
| 2004/0199388 A1 * | 10/2004 | Armbruster et al. | 704/251 |
| 2005/0071163 A1 * | 3/2005 | Aaron et al. | 704/260 |
| 2005/0125227 A1 * | 6/2005 | Kamai et al. | 704/258 |

FOREIGN PATENT DOCUMENTS

| | | |
|---|---|---|
| EP | 1271 469 A1 | 1/2003 |
| JP | 02/31810 | 4/2002 |
| WO | WO-0231810 | 10/2001 |
| WO | 02/097590 | 12/2002 |
| WO | WO-02097590 | 12/2002 |

* cited by examiner

PROSODIC MIMIC METHOD AND APPARATUS

CROSS-REFERENCE TO RELATED APPLICATIONS

This application claims benefit under 35 U.S.C. §119(e) of prior U.S. provisional patent application 60/442,267, entitled "Prosodic Mimic for Commands or Names," filed on Jan. 24, 2003, which is incorporated herein by reference.

TECHNICAL FIELD

The present invention relates to voice-enabled communication systems.

BACKGROUND

Many mobile telephones (here meant to encompass at least data processing and communication devices that carry out telephony or voice communication functions) are provided with voice-assisted interface features that enable a user to access a function by speaking an expression to invoke the function. A familiar example is voice dialing, whereby a user speaks a name or other pre-stored expression into the telephone and the telephone responds by dialing the number associated with that name.

To verify that the number to be dialed or the function to be invoked is indeed the one intended by the user, a mobile telephone can display a confirmation message to the user, allowing the user to proceed if correct, or to abort the function if incorrect. Audible and/or visual user interfaces exist for interacting with mobile telephone devices. Audible confirmations and user interfaces allow a more hands-free operation compared to visual confirmations and interfaces, such as may be needed by a driver wishing to keep his or her eyes on the road instead of looking at a telephone device.

Speech recognition is employed in a mobile telephone to recognize a phrase, word, sound (generally referred to herein as utterances) spoken by the telephone's user. Speech recognition is therefore sometimes used in phonebook applications. In one example, a telephone responds to a recognized spoken name with an audible confirmation, rendered through the telephone's speaker output. The user accepts or rejects the telephone's recognition result on hearing the playback.

In human speech, each utterance has certain qualities that can be quantified, called prosodic parameters, which determine what the utterance sounds like. These are usually considered pitch or tone, timing of elements of the speech, and stress, usually represented as energy. Speech recognition systems use other features of speech, such as vocal tract shape, which are non-prosodic but help determine what was said. Human listeners are adept at discerning qualities of speech based in part on the prosodic parameters of the speech. Also, human speakers use prosody in speech to aid overall communication and to distinguish their speech from that of other speakers. Humans are thus naturally sensitive to prosody, and can easily determine the difference between "real" human speech and "synthesized" speech produced by a machine (speech synthesizer). In fact, synthesized speech using poor prosodic rules can be unintelligible to the human ear.

SUMMARY

Generally, aspects of the present invention feature methods and systems for synthesizing audible phrases (words) that include capturing a spoken utterance, which may be a word, and extracting both prosodic and non-prosodic information (parameters) there from, recognizing the word, and then applying the prosodic parameters to a synthesized (nominal) version of the word to produce a prosodic mimic phrase corresponding to the spoken utterance and the nominal word.

One aspect of the present invention features a method for speech synthesis, including receiving a spoken utterance; extracting one or more prosodic parameters from the spoken utterance; decoding the spoken utterance to provide a recognized word; synthesizing a nominal word corresponding to the recognized word; and generating a prosodic mimic word using the nominal word and the prosodic parameters.

Another aspect of the invention features a system for speech synthesis, including an audio input device that receives a spoken utterance; a pitch detector that detects a pitch of the spoken utterance; a signal processor that determines a prosodic parameter of the spoken utterance; a decoder that recognizes the spoken utterance and provides a corresponding recognized word; a speech synthesizer that synthesizes a nominal word corresponding to the recognized word; and a prosodic mimic generator that receives the nominal word and the prosodic parameter and generates a prosodic mimic word.

Yet another aspect of the present invention features a computer readable medium having stored instructions adapted for execution on a processor, including instructions for receiving a spoken utterance; instructions for extracting one or more prosodic parameters from the spoken utterance; instructions for decoding the spoken utterance to provide a recognized word; instructions for synthesizing a nominal word corresponding to the recognized word; and instructions for generating a prosodic mimic word using the nominal word and the prosodic parameters.

These and other aspects of the invention provide improved speech synthesis, especially in small mobile devices such as mobile telephones with voice activated commands and user interfaces. In one respect, better synthesis of audible confirmation messages is enabled, the audible confirmation messages having prosodic attributes resembling those of the user. Better speech synthesis sounds more natural and is more understandable to humans, therefore the present invention improves the usefulness and intelligibility of audible user interfaces.

Various features and advantages of the invention will be apparent from the following description and claims.

BRIEF DESCRIPTION OF THE DRAWINGS

For a fuller understanding of the nature and objects of the present invention, reference should be made to the following detailed description taken in connection with the accompanying drawings in which the same reference numerals are used to indicate the same or similar parts wherein.

DETAILED DESCRIPTION

As discussed briefly above, human speech includes not only the substantive content (what words and sounds are made), but also information about the way the words and sounds are produced. Generally, a set of parameters (prosodic parameters) at least partially describes how a spoken word or utterance is vocalized and what it sounds like. Examples of prosodic parameters are pitch, energy and timing. Better use of prosodic content can produce more natural and intelligible synthetic speech, a feature useful in modern communication systems like mobile telephones, which use synthesized audio interfaces.

A telephone device according to the present invention uses a speech synthesis circuit, logic, and executable code instructions to produce an audible signal delivered through its speaker output. By extracting and using prosodic features of a user's spoken words to synthesize and generate an audible output, the telephone device synthesizes high quality realistic-sounding speech that sounds like the user's voice. One specific application is in improving the quality and intelligibility of synthesized voice messages used to confirm spoken commands of a mobile telephone user.

Figure 1:
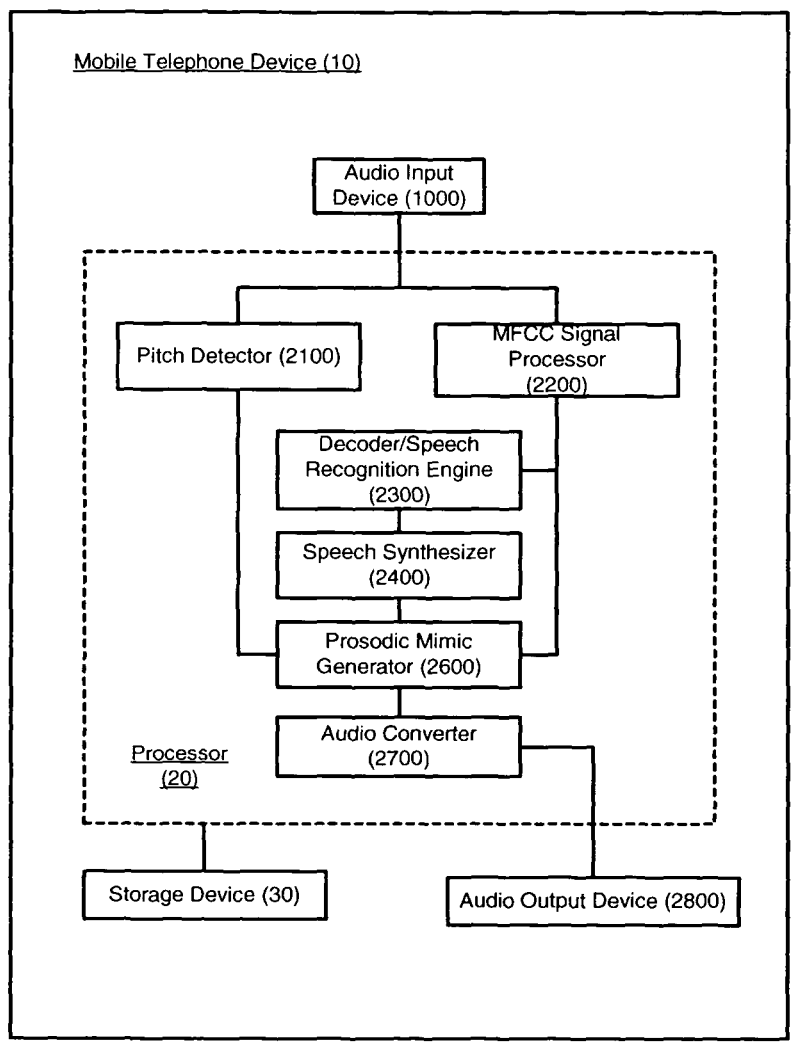
FIG. 1 is a block diagram of a mobile telephone device with a speech interface system.

FIG. 1 is a block diagram of a mobile telephone device 10 having a voice user interface. The system includes input, output, processing, and storage components.

An audio input device 1000 receives a spoken utterance. The audio input device is a microphone, and more specifically, is the same microphone used to communicate over the mobile telephone device 10.

The audio input device 1000 provides the received audio input signal to a pitch detector 2100 and a Mel Frequency Cepstral Compact (MFCC) signal processor 2200, which extracts both prosodic and non-prosodic parameter information from the received audio signal.

Decoder/speech recognition engine 2300 recognizes the spoken utterance and provides a recognized word to a speech synthesizer 2400. The recognized word is also provided as text to a visual display device (not shown).

The speech synthesizer 2400 synthesizes a nominal (default) form of the recognized word using rules that are preprogrammed into the system and that do not depend on the prosodic parameters of the spoken utterance.

To generate the prosodic mimic word, the prosodic mimic generator 2600 acts on the nominal synthesized word and applies the pitch, timing, or other prosodic parameters to the nominal synthesized word. The prosodic mimic generator 2600 adjusts the generated prosodic mimic word length by stretching or compressing the word in time. In the whole-word model of FIG. 2, the beginning and end of the whole word act as temporal reference points, whereas in the phone-level model the individual phones act as the temporal reference points.

Once the prosodic mimic phrase is generated it is converted into a form suitable for audible output. The audio converter 2700 receives the prosodic mimic phrase and performs the necessary conversion to an electrical signal to be played by the audio output device 2800.

The embodiment shown in FIG. 1 implements all but the input/output and memory storage components in a processor 20. Of course, more than one processor can be employed to achieve the same result. This includes embodiments employing multiple specialty processors, such as digital signal processors (DSPs).

Storage device 30 is a memory component that includes a machine-readable medium holding programmed software instructions. The machine is a data processor that reads and processes the instructions. The instructions are executed in the processor 20 or its components to carry out the functions of the system. An operating system is installed on the system that facilitates execution of the stored instructions for carrying out the voice recognition, processing, prosodic parameter extraction, speech synthesis, and mimic word generation. The storage device 30, is shared by the software instructions described herein, as well as by other program instructions belonging to other programs. For example, program instructions for controlling the ring tone, display graphics, and other features of the mobile telephone device can also reside in memory space allocated for these instructions within storage device 30.

Figure 2:
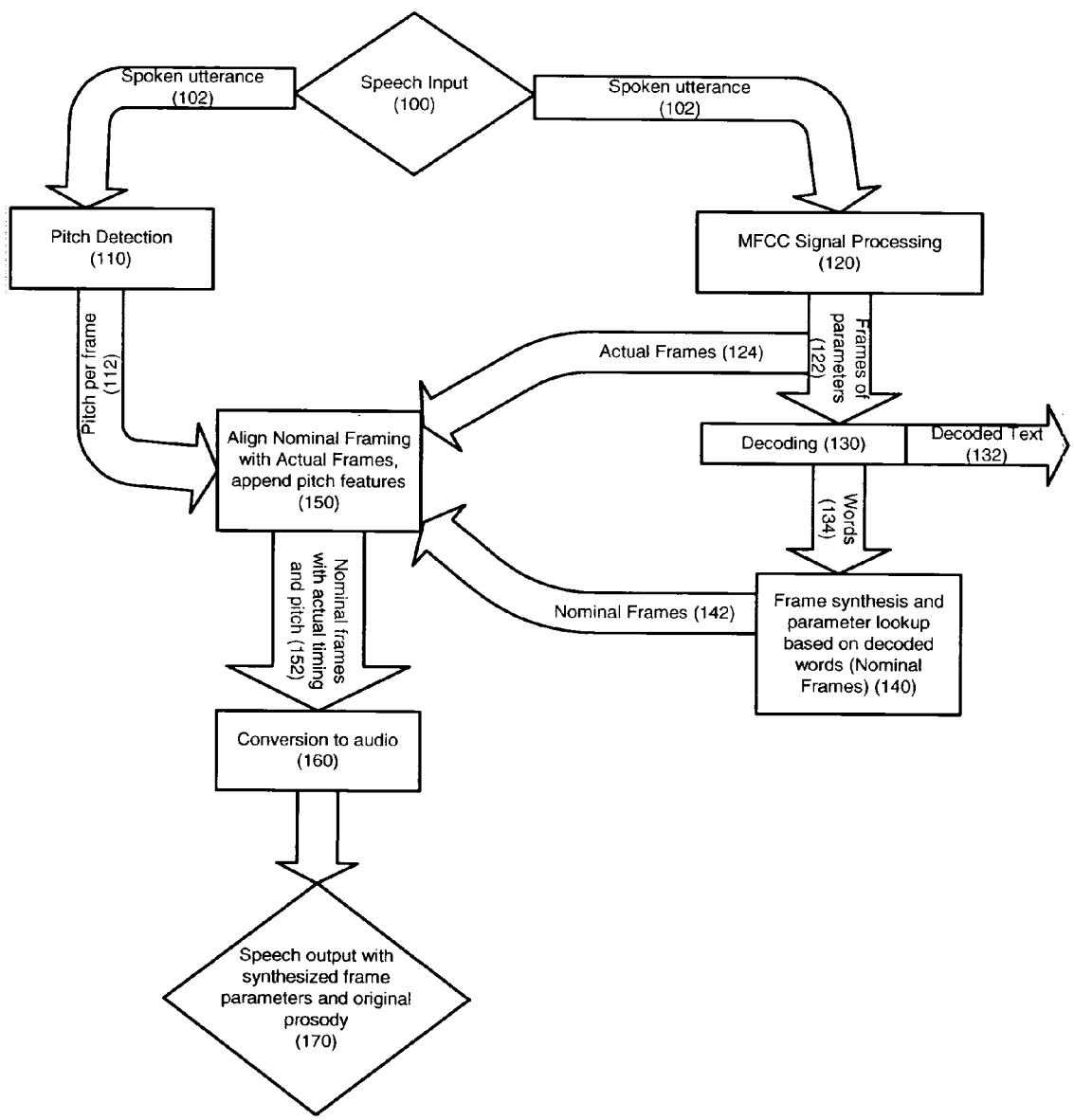
FIG. 2 is a block diagram of a process for synthesizing speech using a whole-word model.

FIG. 2 is a block diagram of a process for generating synthesized utterances by using prosodic information from received spoken words. The functional blocks of the diagram correspond to physical components, as shown in FIG. 1, which carry out the functions of the functional blocks. An utterance is divided into frames. The length of the frames affects the quality of the speech synthesis. The embodiment shown in FIG. 2 processes utterances on a frame-by-frame basis, where a frame is a predefined time segment. For speech applications, a frame length that is too long can lead to inaccuracies and low quality speech synthesis, while a frame length that is too short requires more computing resources (processing, storage, etc.). In the described embodiment, the frame length is approximately 10-20 milliseconds in duration.

An input device, such as a microphone, captures a spoken utterance 102 (for example, the phrase "CALL HOME") at step 100. The spoken utterance 102 corresponds to an action to be taken by the mobile telephone device, here calling the user's home phone. In this example, the telephone looks up and dials the telephone number (HOME) whose name was spoken.

The system analyzes spoken utterance 102 for its prosodic parameters and extracts the values for the prosodic parameters. The system extracts, for example, the pitch of the spoken utterance. Pitch generally refers to the overall frequency content of the voice. Step 110 depicts pitch detection.

The system also extracts the spectral content, e.g., mel cepstra, and energy content of spoken utterance 102 at step 120. A MFCC analyzer measures the MFCC Cepstrum of the spoken utterance 102. The MFCC analyzer outputs frames of prosodic parameters at step 122.

A decoder or speech recognition engine decodes or recognizes the spoken utterance at step 130. The decoder employs hardware and software to select a recognized word from a set of possible known words. The decoder recognizes a recognized word, corresponding to the spoken utterance, and provides the word as a text output 132 to visually indicate the results of the decoding. A display device of the mobile telephone shows the text output 132 to the user.

The decoder also delivers the recognized word 134 to a speech synthesizer that uses the recognized word and a set of default programmed (nominal) synthesis rules to generate synthesized nominal word frames at step 140. In this embodiment, the decoder uses a whole-word model, and the synthesis takes place at the word level.

A prosodic mimic generator generates the prosodic mimic phrase using the recognized word's nominal synthesized frames 142, the captured prosodic parameters provided in the pitch per frame 112 and the actual frames 124. The prosodic mimic generator applies the prosodic parameters to the nominal frames 142 on a frame-by-frame basis. Furthermore, in step 150, the prosodic mimic generator temporally aligns the generated mimic word with the nominal word, at a whole-word level. In other words, the recognized word 134 is aligned in time with the corresponding captured spoken word by forcing the start and end points of the nominal word to correspond to those of the spoken word.

The prosodic mimic generator applies the captured prosodic parameters, such as pitch, to the nominal word, thereby mimicking the prosody of the spoken utterance 102. The prosodic mimic generator also adjusts the length of the generated phrase by stretching and compressing the phrase to obtain the desired length. Stretching and compression of the prosodic mimic phrase is done by adding and removing frames, respectively, from the phrase in order to match the phrase length to that of the spoken utterance. The result is a synthesized prosodic mimic phrase that, owing to its prosody, mimics the original spoken word in its content and its sound.

An audio converter receives the generated prosodic mimic phrase and converts the nominal frames with the applied actual timing and pitch 152 into an audio signal to be played on the mobile telephone's speaker (step 160). The speaker is the same speaker over which the user hears the ordinary telephone communication output.

The end result of the process described above is a natural-sounding audible phrase resembling the originally spoken utterance 102. This synthesized mimic phrase is used as an audible confirmation message played back to the mobile telephone user to confirm the command to be carried out or the name to be dialed.

Figure 3:
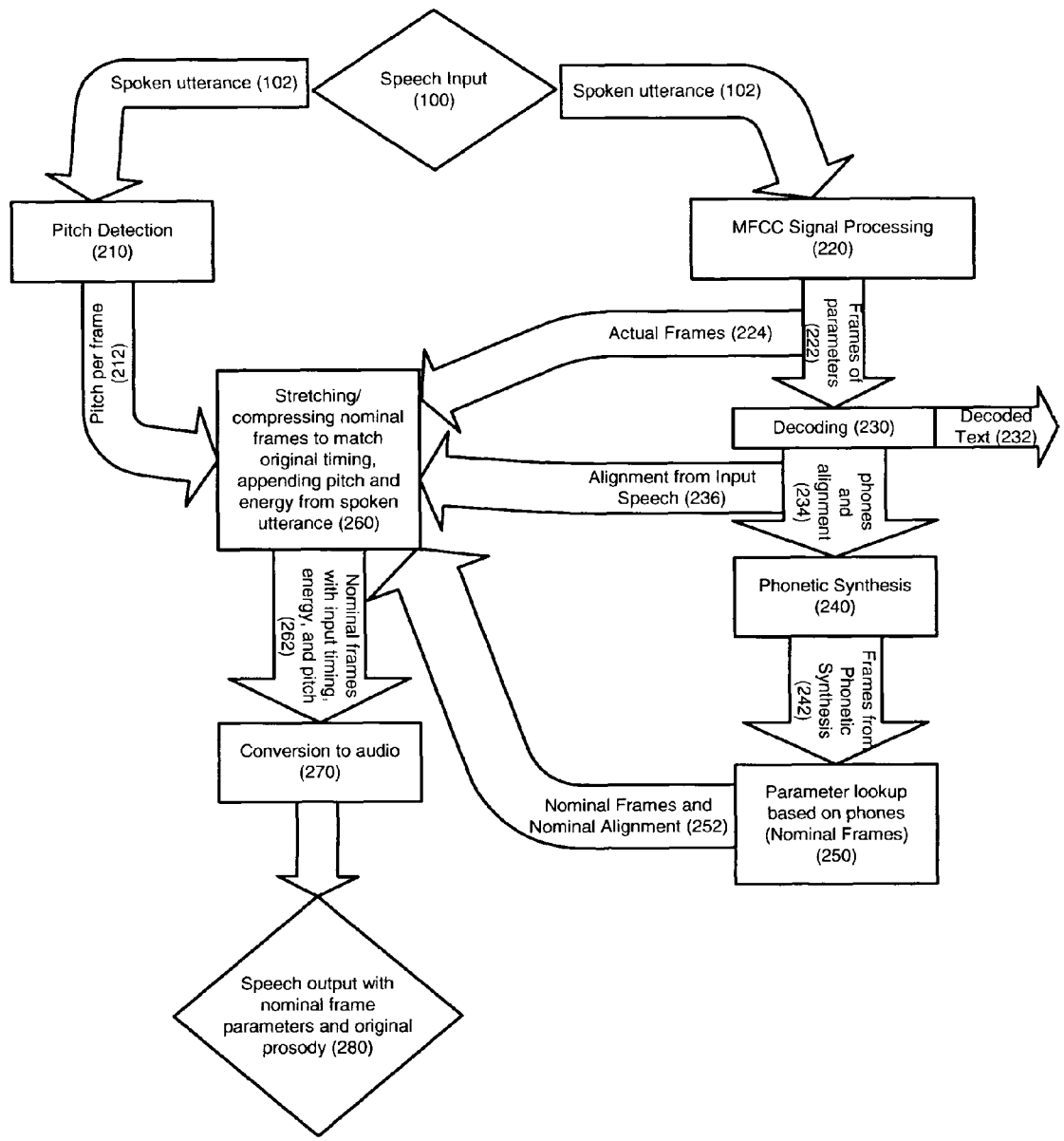
FIG. 3 is a block diagram of a process for synthesizing speech using a phone-level model.

FIG. 3 illustrates a process using a phone-level model, according to which words are synthesized at a finer level of detail than is done in the whole-word model. Generally, phones are acoustic constituents of speech. A spoken language includes a set of phones which are used to form the sounds of the spoken language. For example, "HOME" contains three phones: "H", "O" and "M." It is possible to improve the quality and accuracy of speech synthesis if speech is treated at the phone level rather than on a whole-word level.

An input device, such as a microphone, captures a spoken utterance in step 100, as described earlier. One or more signal processors and a pitch detector extract prosodic parameters (pitch, energy and/or timing) from the spoken utterance 102. The pitch detector detects the spoken utterance's pitch at step 110, and a MFCC analyzer extracts the mel cepstra and timing parameters at step 220. Some of the timing information may come from a decoder, which may be part of a speech recognition system.

A decoder recognizes the speech at step 230. The decoder outputs a selected recognized word 232 to a visual display unit, and also outputs individual phones 234 and alignment information of the recognized word to a phonetic speech synthesizer. The decoder provides alignment information 236 for use in generating a prosodic mimic phrase later.

A phonetic speech synthesizer takes the phones and alignment output from the decoding step 230 and performs a phone-level synthesis of the recognized words at step 240. The speech synthesizer outputs frames from the phonetic synthesis 242.

Parameter lookup step 250 is based on nominal frame phones, and provides nominal frames and nominal alignment information 252.

A prosodic mimic generator receives the nominal frames at step 260, as well as the captured actual frames 224, alignment information 236, pitch-per-frame data 212, and the nominal frames with nominal alignment 252. The prosodic mimic generator outputs a set of nominal frames having timing, energy and pitch derived from the input spoken phrase 102. This is the prosodic mimic phrase 262.

As described for the earlier embodiment of FIG. 2, the nominal selection is synthesized using the extracted prosodic parameters obtained from the spoken word. However, in this embodiment, rather than time-aligning the nominal word to the spoken word, the constituent phones are used as the temporal indexing points or boundary markers that delineate the nominal-to-spoken alignment process. In other words, the embodiment of FIG. 3 aligns the phones within words, as well as the words themselves, thereby imposing greater constraints on the overall time-alignment process.

As described previously, an audio converter converts the prosodic mimic word 262 to an audio signal in step 270. An audio output device delivers an audible signal to the telephone's user at step 280. A digital-to-analog converter converts the digital prosodic mimic word signal into a signal that can be played on the telephone device's speaker.

The concepts described above are not limited to the uses recited in the illustrative embodiments provided, but can be extended to other systems and circumstances. For example, the application of such techniques and devices can extend to any voice-driven electronic device, including personal planners, toys, automotive navigation equipment, home electronics, home appliances, and computing devices in general.

The present system and methods are also not limited to words only, but to any portion of a word or combination of words, phrases, sentences, audible gestures, etc. in any spoken language. Therefore, we refer to any and all of these as utterances.

These concepts may be used in combination with other human-machine interfaces. For example, not only does the mobile telephone provide its user with audible and/or visual feedback to confirm a command or number to be dialed, but it can also require actions on the part of the user to accomplish such commands. The user may be required to press a confirmatory button on the mobile telephone to indicate agreement with the recognized and synthesized word, or the user may be required to say "YES" or "OK" to make a final acceptance of a synthesized audible message.

Upon review of the present description and embodiments, those skilled in the art will understand that modifications and equivalent substitutions may be performed in carrying out the invention without departing from the essence of the invention. Thus, the invention is not meant to be limited by the embodiments described explicitly above, rather it should be construed by the scope of the claims that follow.

What is claimed is:

1. A method for speech synthesis, said method implemented on a handheld device and comprising:
   receiving a spoken word;
   in response to receiving the spoken word:
   extracting one or more prosodic parameters from the spoken word;
   performing speech recognition on the spoken word to generate a recognized word;
   from the recognized word that is generated from the speech recognition, synthesizing a nominal word comprising nominal frames from default synthesis rules;
   temporally aligning end points of the recognized word with the spoken word by forcing end points of the synthesized nominal word to correspond to the spoken word;
   applying the one or more prosodic parameters to the nominal word;
   adding frames to or removing frames from the nominal frames to adjust timing of the nominal word to match the length of the spoken word;
   generating a prosodic mimic word based on the applied prosodic parameters and the time adjustment performed on the nominal word; and
   playing back the generated prosodic mimic word on the handheld device.

2. The method of claim 1, wherein the one or more prosodic parameters include pitch.

3. The method of claim 1, wherein the one or more prosodic parameters include timing.

4. The method of claim 1, wherein the one or more prosodic parameters include energy.

5. The method of claim 1, wherein temporally aligning end points of the recognized word with the spoken word by forcing the end points of the synthesized nominal word to correspond to the spoken word comprises temporally aligning end points of phones of the recognized word with phones of the spoken word by forcing end points of phones of the synthesized nominal word to correspond to the phones of the spoken word.

6. The method of claim 1, wherein the spoken word utterance is received by a telephone input device.

7. A handheld system for speech synthesis, said system comprising:
   an audio input device capable of receiving a spoken word;
   a signal processor that, in response to receiving the spoken word, determines one or more prosodic parameters of the spoken word;
   a speech recognizer that, in response to receiving the spoken word, recognizes the spoken word and generates a corresponding recognized word;
   a speech synthesizer that uses default synthesis rules to synthesize a nominal word comprising nominal frames from the recognized word; and
   a temporal aligner that temporally aligns end points of the recognized word with the spoken, word by forcing end points of the synthesized nominal word to correspond to the spoken word;
   a prosodic mimic word generator that:
      applies the one or more prosodic parameters to the nominal word;
      adds frames to or removes frames from the nominal frames to adjust timing of the nominal word to match the length of the spoken word; and
      generates a prosodic mimic word based on the applied prosodic parameters and the time adjustment performed on the nominal word; and
   an audio output device capable of playing back the generated prosodic mimic word.

8. The system of claim 7, wherein the system is disposed on a mobile telephone device.

9. The system of claim 7, further comprising a storage device including executable instructions for speech analysis and processing.

10. The method of claim 1, wherein receiving a spoken word further comprises receiving a command to be executed by the handheld device.

11. The method of claim 1, further comprising receiving confirmation from a user of the handheld device.

12. The method of claim 10, wherein the command is any one of a plurality of available commands.

13. The method of claim 10, further comprising executing the command on the handheld device.

14. The method of claim 1, wherein receiving a spoken word further comprises receiving a name to be dialed by the handheld device.

15. The method of claim 14, further comprising dialing a number corresponding to the name.

16. A computer program product, tangibly embodied in a non-transitory machine-readable storage medium, the computer program product including instructions operable to cause a data processing apparatus to:
   receive a spoken word;
   extract one or more prosodic parameters from the spoken word;
   perform speech recognition on the spoken word to generate a recognized word;
   from the recognized word that is generated from the speech recognition, synthesize a nominal word comprising nominal frames from default synthesis rules;
   temporally align end points of the recognized word with the spoken word by forcing end points of the synthesized nominal word to correspond to the spoken word;
   apply the one or more prosodic parameters to the nominal word;
   add frames to or removing frames from the nominal frames to adjust timing of the nominal word to match the length of the spoken word;
   generate a prosodic mimic word based on the applied prosodic parameters and the time adjustment performed on the nominal word; and
   play back the generated prosodic mimic word.

17. The computer readable medium of claim 16, wherein the medium is disposed within a mobile telephone apparatus and operates in conjunction with a user interface.

18. The method of claim 1, further comprising displaying the recognized word on a display of the handheld device.

19. The method of claim 1, wherein extracting one or more prosodic parameters from the spoken word further comprises measuring the MFCC cepstrum of the spoken word.

* * * * *